ns011894757B2

(12) United States Patent
Kegeler

(10) Patent No.: US 11,894,757 B2
(45) Date of Patent: Feb. 6, 2024

(54) ACTIVELY COOLED COIL

(71) Applicant: Schaeffler Technologies AG & Co. KG, Herzogenaurach (DE)

(72) Inventor: Joerg Kegeler, Schleusingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 551 days.

(21) Appl. No.: 17/254,745

(22) PCT Filed: Jun. 3, 2019

(86) PCT No.: PCT/DE2019/100487
§ 371 (c)(1),
(2) Date: Dec. 21, 2020

(87) PCT Pub. No.: WO2020/001682
PCT Pub. Date: Jan. 2, 2020

(65) Prior Publication Data
US 2021/0273524 A1    Sep. 2, 2021

(30) Foreign Application Priority Data
Jun. 28, 2018    (DE) .......................... 102018115654.5

(51) Int. Cl.
*H02K 9/19*    (2006.01)
*H02K 3/24*    (2006.01)
(Continued)

(52) U.S. Cl.
CPC ................. *H02K 9/19* (2013.01); *H02K 3/24* (2013.01); *H02K 3/26* (2013.01); *H02K 15/0407* (2013.01)

(58) Field of Classification Search
CPC .............. H02K 9/19; H02K 3/24; H02K 3/26; H02K 15/0407
See application file for complete search history.

(56) References Cited

U.S. PATENT DOCUMENTS 4,314,295 A * 2/1982 Frandsen ............... H02K 41/03
360/78.12
5,760,502 A * 6/1998 Van Loenen ............ H02K 3/26
310/12.08
(Continued)

FOREIGN PATENT DOCUMENTS

DE    112012002829 T5    4/2014
DE    102013100622 A1    7/2014
(Continued)

*Primary Examiner* — Jianchun Qin
(74) *Attorney, Agent, or Firm* — Volpe Koenig

(57) ABSTRACT

A coil system, including: pairs of planar coils vertically stacked in a vertical direction, each pair of planar coils including a first planar coil including a first outer turn and a second planar coil including a second outer turn overlapping the first outer turn and laterally offset from the first outer turn; and pairs of vertically stacked thermal conductor tracks, each pair of thermal conductor tracks including a first track and a second track overlapping the first track, laterally offset from the first track, and overlapping the first outer turns of the pairs of planar coils. The pairs of thermal conductor tracks are DC isolated from pairs of planar coils. The first outer turns and the second outer turns of the pairs of planar coils form a first comb-like structure. The plurality of pairs of thermal conductor tracks form a second comb-like structure engaged with the first comb-like structure.

19 Claims, 6 Drawing Sheets

(51) Int. Cl.
 *H02K 3/26* (2006.01)
 *H02K 15/04* (2006.01)

(56) References Cited

U.S. PATENT DOCUMENTS

| | | | | |
|---|---|---|---|---|
| 5,831,331 A | * | 11/1998 | Lee | H01L 23/645 |
| | | | | 257/532 |
| 6,664,664 B2 | * | 12/2003 | Botos | H02K 3/26 |
| | | | | 310/12.25 |
| 7,489,218 B2 | * | 2/2009 | Lee | H01F 17/0006 |
| | | | | 336/84 C |
| 7,808,356 B2 | * | 10/2010 | Papananos | H03H 7/42 |
| | | | | 336/200 |
| 8,143,986 B2 | * | 3/2012 | Tanabe | H01L 23/5227 |
| | | | | 336/200 |
| 8,482,929 B2 | * | 7/2013 | Slaton | H05K 1/0206 |
| | | | | 361/759 |
| 9,048,017 B2 | * | 6/2015 | Kireev | H01F 17/0013 |
| 2015/0130579 A1 | * | 5/2015 | Kim | H01F 41/06 |
| | | | | 336/200 |
| 2015/0194258 A1 | | 7/2015 | Scholz | |

FOREIGN PATENT DOCUMENTS

| | | |
|---|---|---|
| DE | 102015206697 A1 | 10/2016 |
| DE | 102015211852 A1 | 12/2016 |
| WO | WO-2017080554 A1 * 5/2017 | ......... H01F 27/2804 |

* cited by examiner

Figure 3A:
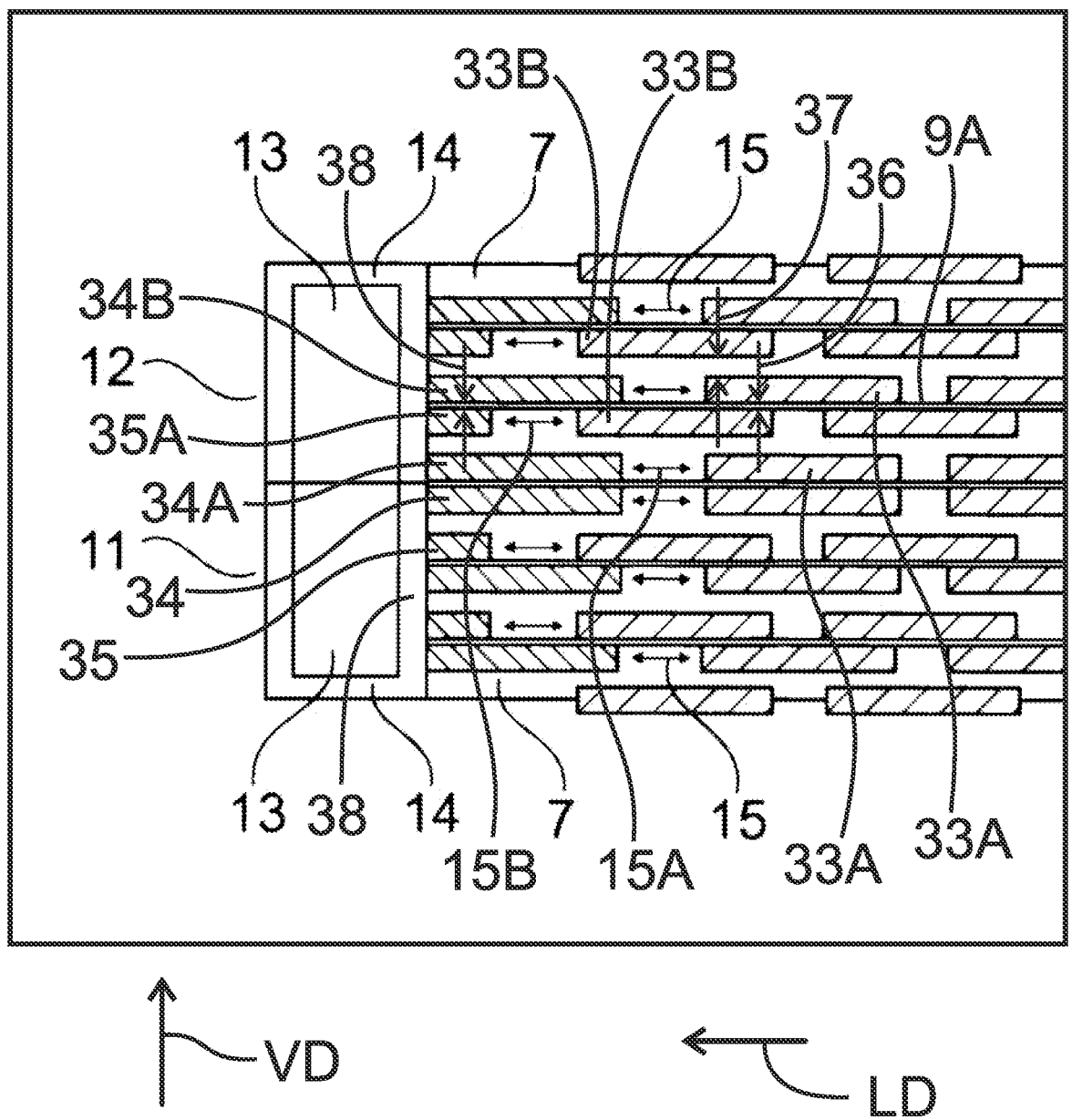

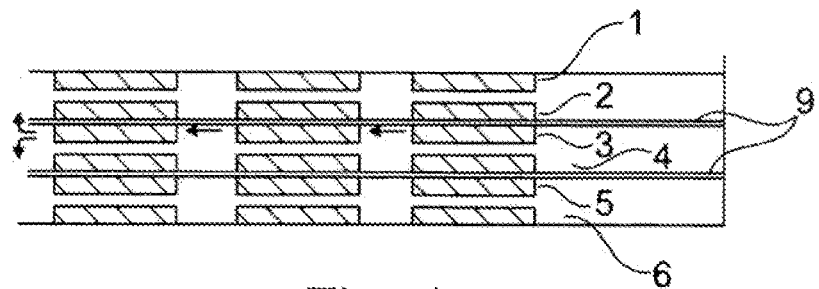
Fig. 1
(Prior art)
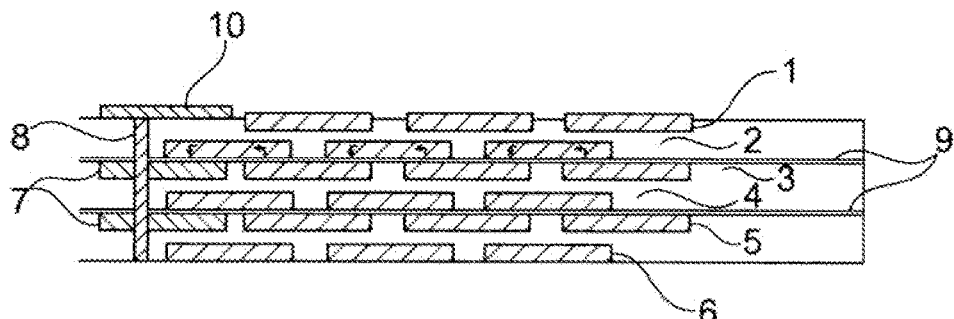
Fig. 2
(Prior art)
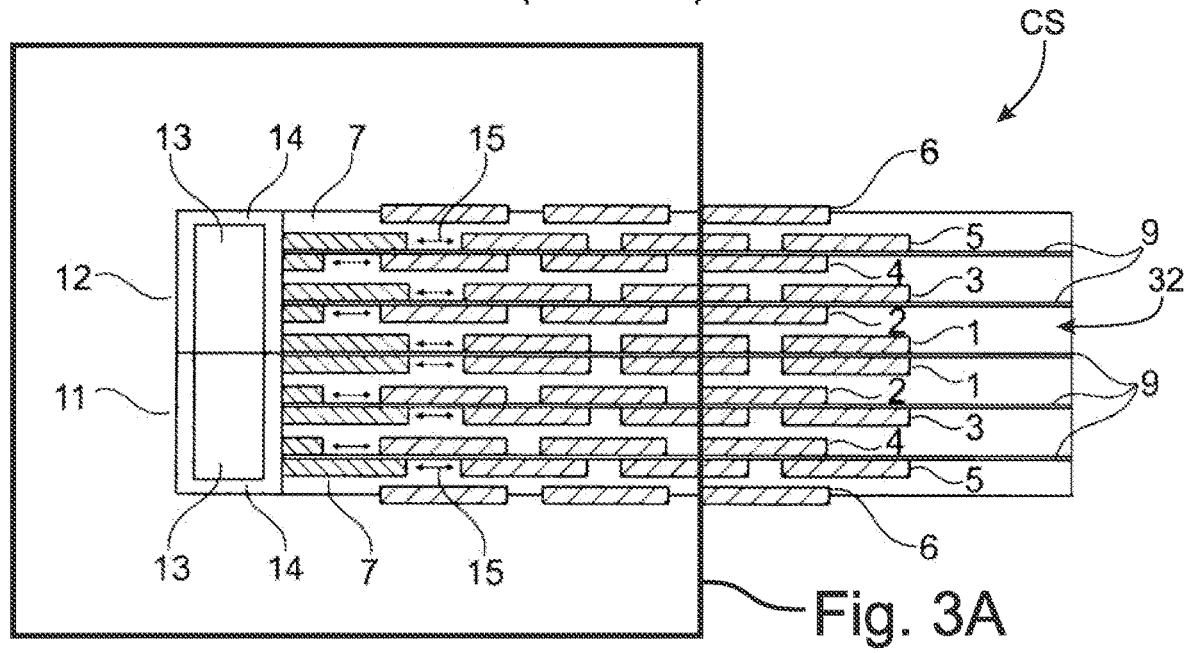
Fig. 3
Fig. 3A

ACTIVELY COOLED COIL

CROSS-REFERENCE TO RELATED APPLICATION

The present application is the U.S. national stage application pursuant to 35 U.S.C. § 371 of International Application No. PCT/DE2019/100487, filed 3 Jun. 2019, which application claims priority from German Patent Application DE 10 2018 115 654.5 filed 28 Jun. 2018, which applications are incorporated herein by reference in their entireties.

TECHNICAL FIELD

The present disclosure relates to a coil system including a first coil with a large number of planar coils which are layered one above the other. The present disclosure further includes a method for producing such a coil system. Such a coil system can be used, for example, for compact and lightweight electric motors, as required in the field of servo drives. These can be linear motors as well as rotary motors.

BACKGROUND

The term "planar coil" generally covers a winding that only extends in one plane. Several planar coils situated vertically one above the other can be electrically connected to one another so that they form a type of cylinder coil. The term flat coil is also used as a synonym for the term planar coil in the following.

A coil system with a coil that consists of a large number of planar coils that are arranged in layers one above the other is known, for example, from DE102008062575A1. The coil system disclosed in DE102008062575A1 is implemented in the form of a multilayer board and forms the primary part of a linear motor. The various layers of this multilayer board are largely filled with windings that can be energized. The turns situated one above the other are vertically electrically connected to what are termed vias and thus each form a solenoid coil for a phase of the linear motor. In this way, a particularly light and compact primary part for a linear motor can be implemented, which is particularly suitable as a rotor for highly dynamic applications.

FIG. 1 shows, in a cross-section perpendicular to the surface, a multilayer board of an arrangement of planar coils 1-6 known from the prior art, which are stacked one above the other in layers and are connected to form a type of solenoid coil. In each level of this multilayer board there is an example of a planar coil 1-6, each having three turns. The turns run either from the inside to the outside or from the outside to the inside. For example, the winding of a first planar coil 1 is wound from the outside to the inside and is electrically connected to a second winding of a second planar coil 2 below it via an electrical via. This second planar coil 2 is in turn wound from the inside to the outside and is in turn connected to a third planar coil 3 in the third level of the multilayer board shown via a further electrical via (not shown here). In this way, a cylinder coil or a solenoid is created which extends over six levels of the multilayer board.

The multilayer board technology is particularly suitable for implementing applications with high electrical power in a compact and lightweight design. An example of this is the primary part of the linear motor from DE102008062575A1 already mentioned, which is implemented as a multilayer board. Because of the high currents in such applications, heat removal is a particular challenge. The higher the energy density of the multilayer board, the more compact the design can be, but the greater the requirements for heat removal from the multilayer board. As can be seen in FIG. 1, in order to remove heat from the multilayer board, the heat generated in an inner turn of a planar coil must be dissipated laterally to the outer edge of the multilayer board, where it can then be conducted to the surface of the board. An insulation gap is required between the individual turns of each planar coil, which for technological reasons must be around a few hundred micrometers. Neither the board material made of fiber-reinforced plastic nor the prepreg layers usually used to isolate the various layers have a good thermal conductivity. Accordingly, the lateral heat transport within such a board stack represents a particular challenge.

A lateral heat dissipation in a layered coil system in the form of a multilayer board is disclosed in DE102015222400A1. DE102015222400A1 teaches a coil system with flat coils situated vertically one above the other in layers are each arranged with a lateral offset to each other, so that in a cross-section perpendicular to the surface of the multilayer board, conductor track sections of a flat coil are always arranged vertically, partially overlapping with two conductor track sections of another flat coil, which are in vertical proximity to said flat coil.

The partial overlap enables lateral heat transport to take place across layers. This means that the heat generated in a conductor track section has the possibility of reaching the edge region laterally by passing over to a vertically adjacent conductor track section of another planar coil which, rather, has a lateral offset. Such a shingle-like structure, which enables lateral heat transport across layers, is illustrated in FIG. 2. The arrows illustrate how the heat transport passes from a planar coil 3 to a planar coil 2 located above it, which has a lateral offset to the planar coil 3, i.e., causes a type of shingling.

The two planar coils 2, 3 are only separated from one another by a very thin prepreg layer of approximately 50 μm to 200 μm. The lateral gap between two turns of a planar coil of a plane cannot be minimized as desired for process engineering reasons. Laterally, the gap between the turns is a minimum of 200 μm. (These gap ratios are not shown to scale in the figures.)

For example, a typical conductor track has a lateral width of 1 mm, while the thickness of the conductor tracks is 100 μm, for example. Without the lateral offset of the conductor tracks, the thermal conductivity in the lateral direction is determined by the gap between the turns in the lateral direction and the thickness of the conductor tracks. As a result of the shingling, this thermal conductivity is connected in parallel with a further conductivity, which includes a cross-layer heat transport in the vertical direction. The thermal resistance that is decisive for this depends primarily on the gap between the turns of vertically adjacent planar coils that are partially overlapping and the proportion of the conductor track width that represents the overlap region. If, for example, both the lateral gap of the turns and the vertical gap of the planar coils which are situated one above the other is 200 μm and the area of a 1 mm wide conductor track which vertically overlaps a conductor track of an adjacent planar coil extends over 400 μm of the total conductor track width, then the thermal conductivity in the vertical direction is four times as large as in the lateral direction if the thickness of the conductor tracks is 100 μm. With a shingled arrangement of the planar coils which are situated one above the other, this results in more than four times the thermal conductivity compared to an arrangement of the planar coils in complete overlap, i.e., without shingling.

Therefore, the shingling enables a cross-layer lateral heat transport with a significantly better thermal conductivity, since the vertical insulation gap corresponds to less than a fifth of the lateral insulation gap between the turns DE102015222400A1 also discloses a passive conductor track structure 7 which engages in a comb-like manner in the outer conductor track sections of the planar coils 1-6 which are stacked and shingled. This conductor track structure 7 is not energized. It is DC-isolated from all current-carrying elements on the multilayer board. The passive conductor track structure 7 has the task of transporting the heat which is conducted in the lateral direction through the multilayer board in the way already described, vertically to one or both surfaces of the multilayer board. The conductors of the passive conductor track structure 7 which are situated one above the other are connected to one another by what is termed a thermal via 8 in order to enable heat exchange between the passive conductor tracks in the vertical direction and thus the heat transport to the surface(s). A cooling element can then be provided on the surface(s) in order to dissipate the heat further.

The following provides further detail regarding FIG. 1. As noted above, FIG. 1 shows a coil known from the prior art with planar coils 1-6 which are vertically situated one above the other. The multilayer board consists of a total of three single boards which are layered one above the other, which are separated from one another by two prepreg layers 9. A first board of this board stack is metallized with a first planar coil 1 on its upper side and with a second planar coil 2 on its lower side. Below this first board is a second board with a third planar coil 3 on its upper side and a fourth planar coil 4 on its lower side. At the bottom there is a third board with a fifth planar coil 5 on its upper side and a sixth planar coil 6 on its lower side. These three boards are manufactured using the manufacturing technology known from the prior art. These boards are identical in construction. These boards are then stacked one above the other and separated from one another by the prepreg 9, which has electrically insulating properties. The board stack formed in this way is then baked, so that the prepreg layers 9 mechanically connect the three single boards to one another and electrically insulate them from one another. The prepreg layers 9 are only penetrated at some points by vias (not shown here) which connect the planar coils 1-6 which are situated vertically one above the other, in series.

As already mentioned at the outset, the thermal conductivity in the lateral direction is relatively low with this structure of the multilayer board or the coil system implemented with it, since a relatively large insulation gap must be maintained in each plane between the laterally adjacent turns of the windings for manufacturing reasons. The thickness of the conductor track, which also determines the lateral thermal conductivity within a layer of the multilayer board, is in the range of approx. 100 µm. This electrical insulation gap results in a relatively large thermal resistance.

The coil shown in FIG. 2 and also known from the prior art, has planar coils 1-6 which are also situated vertically one above the other. However, in order to improve heat transport a lateral offset of the vertically directly adjacent conductor track sections is provided. In this way, the heat from the inside of the board can be transported much more easily in the lateral direction, since cross-layer heat transfer is now made possible between the single boards, the thermal resistance of which is determined by the vertical insulation gap between the planar coils and the overlap region of the individual conductor track sections of the vertically adjacent planar coils. This thermal resistance is significantly lower than that within a layer of the board, which is due to the fact that the prepreg layers 9 are relatively thin compared to the lateral gap between the individual turns and the overlap region of the conductor tracks is comparatively large compared to the vertical thickness of the conductor tracks. In a corresponding way, heat transfer from a conductor track section of a layer to a vertically adjacent conductor track section through the prepreg layer 9 is associated with a significantly lower heat transfer resistance than heat transfer from one turn to a laterally adjacent turn on the same plane of the multilayer board. This heat transport is illustrated in FIG. 2 by arrows.

A passive conductor track structure 7 is located on the lateral edge of the multilayer board shown in FIG. 2. Structure 7 engages the outer turns of the windings 2, 4, 6 in a comb-like manner. The passive conductor track structure 7 is electrically insulated from all current-carrying conductor tracks on the multilayer board. Due to the comb-like arrangement of the passive conductor track structure 7, a heat transfer in the vertical direction from the outer turns of the planar coils 2, 4, 6 to the conductor tracks of the passive conductor track structure 7 can take place. The heat transfer must overcome the comparatively low thermal resistance in the vertical direction caused by the prepreg layer 9. The multilayer board is penetrated by a passive via 8 which is in contact with a cooling element 10 which is located on the upper side of the multilayer board. Accordingly, the heat from the individual conductor tracks of the passive conductor track structure 7 is conducted through the thermal via 8 in the vertical direction to the cooling element 10.

If the cooling element 10 (shown here only schematically) can be contacted by a user during operation or is in contact with a liquid coolant, for example, a base insulation must be provided between the cooling element 10 and the passive conductor track structure 7 or the thermal via 8 in order to ensure appropriate contact protection. However, such a base insulation (not shown in FIG. 2) results in high thermal resistance, which opposes the transport of heat from the passive conductor track structure 7 to the coolant.

SUMMARY

The object of the present disclosure is to enable a further increase in the energy density in a coil system including planar coils which are situated one above the other in a shingle-like manner.

The coil system according to the present disclosure includes a first coil with a large number of planar coils which are layered one above the other. In order to improve the lateral heat transport, the above-described shingling known from the prior art is provided. In this context, the term shingling is understood to mean an arrangement in which in each case two planar coils which are situated directly one above the other are vertically layered one on the other with a lateral offset in such a way that, at least in sections, in each case one turn of a first planar coil and two turns of a second planar coil which is arranged directly above the first planar coil are arranged with a partial overlap. A conductor track section of a planar coil is accordingly partially covered by conductor track sections of two turns of a planar coil situated therebelow. Exceptions to this are, of course, the uppermost of the planar coils, which in particular run in a spiral and are layered one above the other, as well as the respective outer turns of the planar coils. The shingling of the conductor tracks of the coils according to the present disclosure also allows individual conductor track sections—for example supply line sections—which are not partially vertical overlap with two conductor track sections of a vertically adjacent coil. However, the majority of the conductor track belonging to a coil satisfies the shingling principle described above and thus enables the lateral heat transport with comparatively low thermal resistance through a cross-layer heat transport.

The lateral offset of the planar coils which are situated one above the other has the consequence that the first coil has a kind of comb-like structure in the region of the outermost turns. This comb structure is created by the vertical offset of two outer turns which are situated one above the other.

The coil system according to the present disclosure also comprises a passive conductor track structure that is DC-isolated from all current-carrying windings of the coil system. This passive conductor track structure also includes a large number of conductor tracks which are layered one above the other. These conductor tracks are layered one above the other in such a way that they also form a comb-like structure. The first comb-like structure of the passive conductor track structure engages in the second comb-like structure, which is formed by the outer turns of the windings which are situated one above the other. The two comb-like structures are DC-isolated from one another. The first comb-like structure is thus electrically insulated from the second comb-like structure.

The present disclosure includes a base insulation of the current-carrying, spiral-shaped, stacked windings from the passive conductor track structure. In particular, no further insulation of the passive conductor track structure is necessary in order to meet the requirements of the base insulation according to DIN EN 60664-1. In accordance with the cited DIN EN 60664-1 in the context of DIN EN 60664-1, base insulation is to be understood as insulation for the basic protection of parts under dangerous voltages. Base insulation is therefore decisive for direct contact protection and differs from functional insulation. Functional insulation only ensures insulation between conductive parts that are only necessary for the intended function of the equipment.

For this purpose, the lateral gap between the outer turn of each winding and the passive conductor track structure must be selected to be sufficiently large. For example, a lateral gap of at least 1.2 mm is required to withstand a test voltage of 4 kV. With such test voltages, for example, printed circuit board motors that are designed for a three-phase input-side supply voltage of 400 V are tested. This results in intermediate circuit voltages of 730 V, for example, when fed in via standard B6 bridge circuits with an intermediate voltage circuit. In the vertical direction, on the other hand, only a 200 μm thick prepreg layer is required between the conductor tracks of the passive conductor track structure which engage one with the other and the outer turns of the coil to ensure basic protection of the passive conductor track structure.

Because the passive conductor track structure is still partially covered vertically with the outer turns of the planar coils which are situated one above the other, the heat can nevertheless be transferred from the current-carrying windings to the passive conductor track structure. As stated above, a thin, insulating prepreg layer between the comb-like interlocking elements of the passive conductor track structure and the outer turns is sufficient in the vertical direction to ensure base insulation. This small insulation gap enables good heat transfer from the first coil to the passive conductor track structure.

As explained above, however, the insulation gap in the lateral direction is more critical. This can be selected to be sufficiently large without significantly impairing the heat transfer to the passive conductor track structure. In an example embodiment, the lateral insulation gap of the passive conductor structure from the outer turns of the first coil is selected so that it is at no point less than 6 times, for example 10 times, the vertical gap between the planar coils which are situated directly one above the other. In this way, base insulation is achieved in the edge region of the coil system by means of the passive conductor track structure, which is thermally connected to the current-carrying coil in an excellent way. Nevertheless, the passive conductor track structure can be base insulated from the voltage-carrying elements and thus also in particular be contacted. Due to a sufficient overlap in the vertical direction between the conductors of the passive conductor track structure and the outer turns of the planar coils, the thermal resistance for heat transport within a plane, which is largely determined by the lateral gap between the passive track structure and the outer turns of the planar coils, must be relatively large to ensure base insulation. The heat transport primarily takes place across layers, because on the one hand a significantly smaller insulation gap must be overcome vertically, on the other hand there is also a larger area available for heat transport through the insulation layer due to sufficient overlap of the conductor tracks within the comb-like structure.

In an example embodiment, the heat removal from the coil system is further improved in that the coil system includes a cooling channel for a liquid coolant. In an example embodiment, this liquid coolant is brought particularly close to the current-carrying first coil in that the cooling channel runs along the edge region of the first coil and is electrically insulated from the first coil by the passive conductor track structure. Because the passive conductor track structure is already base insulated from the first coil, but is still perfectly thermally connected to the first coil, effective cooling of the passive conductor track structure by the liquid coolant also causes efficient cooling of the first coil. The cooling of the first coil is also achieved in that a side of the passive structure facing away from the outer turns of the first coil represents a side wall of the cooling channel. In this way, the liquid coolant is brought into direct contact with the passive conductor track structure, which results in very little heat transfer to the first coil.

By implementing basic protection through the comb-like passive conductor track structure engaging the outer turns of the coil, high electrical insulation strength is combined with good thermal conductance between the coil and the passive conductor track structure. The connection of the cooling duct to the active, heat-generating part of the coil system is correspondingly efficient.

A further improvement of the heat transfer is achieved in that the surface of the cooling channel facing the liquid coolant is copper-plated. The copper-plated surface of the cooling channel is galvanically connected to the large number of conductor tracks of the passive conductor track structure which are layered one above the other. The galvanic connection further optimizes the heat transfer resistance between the liquid coolant and the passive conductor track structure. The heat transfer resistance, in compliance with the current provisions on contact protection, in particular DIN EN 60664-1, results from the passive conductor track structure being base insulated from the first coil.

In an example embodiment, an increase in the magnetic flux density generated by the first coil is achieved in that the large number of planar coils layered one above the other is penetrated by an iron core. The iron core can consist of an SMC material, for example. In an example embodiment, the windings, which are vertically layered one above the other, are insulated from each other by a thin prepreg layer.

In an example embodiment, a prepreg cover layer is provided on an upper and a lower side of the stack of planar coils, which are layered one above the other, bringing about a base insulation of the coil system in each case on the surfaces. In an example embodiment: the first coil is penetrated by an iron core, in particular an iron core made of SMC material; and a prepreg layer on the upper side and the lower side of the stack is used to ensure that the insulation gap between the iron core and the innermost turn of the planar coil is smaller than would be necessary to achieve base insulation. The base insulation of the entire stack is already guaranteed by the prepreg layers on the top and bottom. Reducing the gap between the iron core and the innermost turn of each planar coil further increases the maximum possible flux density that can be generated with the proposed coil system. In particular, if a cooling channel is provided in the edge region of the first coil, which is separated from the passive conductor track structure of the first coil, the top and bottom prepreg layers also have no negative influence on the heat removal from the coil system, since this is not primarily carried out on the upper and lower sides but on at least one end face on which the at least one cooling channel runs.

In an example embodiment, the coil system is designed as a multilayer board. The windings and the conductor tracks of the passive conductor track structure of each layer are arranged on a common single board of the multilayer board. In a first step, single boards are produced and metallized. The desired conductor tracks for forming the respective planar coils and passive conductor track structure of each individual layer are then worked out by etching. The space for a cooling channel for guiding a liquid coolant can also be provided on each single board. The single boards are then layered one above the other to form a stack in such a way that the desired lateral offset results between the planar coils which are layered one above the other, so that the shingled structure is formed. The passive conductor tracks of each single board are also layered one above the other offset laterally in such a way that the first comb structure can be formed.

For insulation purposes, for example, prepreg layers are arranged between the individual single boards. By baking the stack of boards built up in this way, the prepreg layers serve both as an insulation and an adhesive layer between the conductor tracks.

Electrical vias are then introduced to electrically connect the vertically adjacent planar coils to one another. The cooling channel is then milled into the multilayer board. The milling takes place on the side of the passive conductor track structure that faces away from the first coil. In an example embodiment, after the cooling channel has been milled in, the cooling channel is metallized, for example copper-plated, on the inside of the cooling channel. In an example embodiment, a copper layer lining the cooling channel is galvanically connected to the previously applied conductor tracks of the passive conductor track structure. The thermal resistance between the passive conductor track structure and the inner lining of the cooling channel created in this way is thus minimized.

In an example embodiment, the windings and the conductor tracks of the passive conductor track structure of a plurality of layers are produced by a separation process from the same metal sheet, for example a copper sheet, and an insulation layer is arranged between each two windings which are situated directly one above the other.

The planar coils and the conductor tracks of the passive conductor track structure of each layer are, for example, punched out of the metal sheet. The use of punched coils instead of a structure as a multilayer board saves considerable costs. Prepreg can in turn be used as an insulation and adhesive layer between the individual punched coils. In an example embodiment, the windings which are directly layered one above the other are electrically connected to one another by pins made of electrically conductive material, which penetrate the insulation layers present between the windings, in particular the prepreg layers.

In an example embodiment, a simple production of a coil system from punched coils is created when the metal sheet cut out configuration of the individual coils, which are situated one above the other, is always the same. In the example embodiment, the windings and the conductor tracks of the passive conductor track structure of four layers, which are situated one above the other, have the same metal sheet cut. The metal sheet cut within the four layers, which are situated one above the other, is arranged in a second layer as a mirrored metal sheet cut of the first layer. In a third layer, the metal sheet cut of the first layer is rotated by 180 degrees. In a fourth layer, the metal sheet cut of the first layer is mirrored and rotated by 180 degrees. The varied layering creates a stack of four layers, which creates the desired shingling. This arrangement of four layers can be repeated as often as required. The order described here is not mandatory.

In an example embodiment, the coil system includes more than one coil. If, for example, a second coil is also provided in addition to the first coil, the second coil is arranged laterally offset from the first coil. This second coil also includes planar coils which are stacked one above the other and laterally offset from one another. Therefore, the second coil also complies with the shingling principle. The heat transfer in the lateral direction between the first and the second coil is ensured by the fact that the outer turns of the first coil and the outer turns of the second coil engage in a comb-like manner and are thus in vertical overlap. Thus, heat is transferred from the outer turns of the first coil to the outer turns of the second coil again in the vertical direction between conductor track sections which are situated one above the other, in order to be able to subsequently be transported further laterally.

In an example embodiment, a primary part of an electric motor is implemented with the aid of a coil system as described above. This electric motor can, for example, be a linear motor which, in addition to said primary part, also has a secondary part which is spaced apart from the primary part via an air gap and which is in particular equipped with permanent magnets.

In a method for producing a coil system according to some of the previously described embodiments, individual layers are first produced, each including a planar coil and a passive conductor track laterally offset in each respective layer to an outer turn of the planar coil, which is electrically insulated from the planar coil by a lateral insulation gap. This layer can, for example, be a printed circuit board that is correspondingly metallized and etched. However, in an example embodiment, the structure described is punched from sheet copper.

Such individual layers are then arranged one above the other to form a stack. The stacked arrangement creates the shingled structure that causes the lateral heat transport in the stack. An insulation layer is applied between each respective layer. Furthermore, the passive conductor tracks which are layered one above the other form a first comb-like structure which engages in an edge region of the first coil into a second comb-like structure, which is produced by the lateral offset of the outer turns of the windings, which are situated one above the other.

According to the present disclosure, a lateral gap is maintained between the passive conductor track structure and the outer turns of each winding, which causes a base insulation of the first coil in the edge region in which the two comb-like structures engage in each other. The base insulation is guaranteed vertically via the intermediate prepreg layers.

In an example embodiment, two layers, which are stacked one above the other, are separated from one another by an insulation layer, for example a prepreg layer. However, in an example embodiment—in particular in connection with punched coils, the metal sheet cuts used for this purpose are powder-coated. After the individual layers have been layered one above the other, electrical connections are made between the individual planar coils. For this purpose, for example, an electrically conductive pin is used. The pin is driven into corresponding bores, which penetrate the insulation layer.

The present disclosure is explained in more detail below using the exemplary embodiments shown in the figures.

Figure 4:
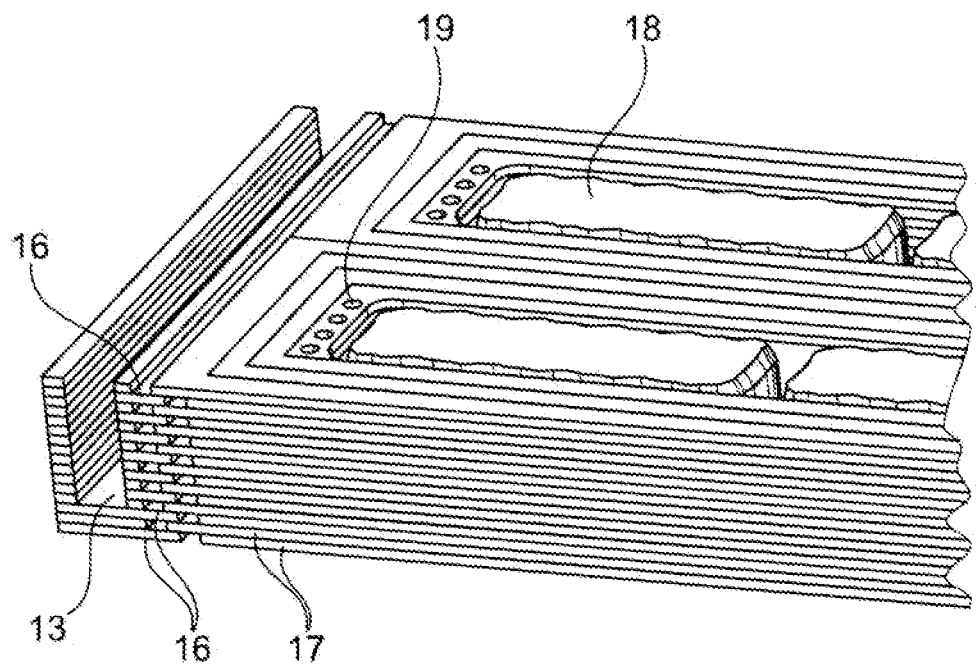
Figure 5:
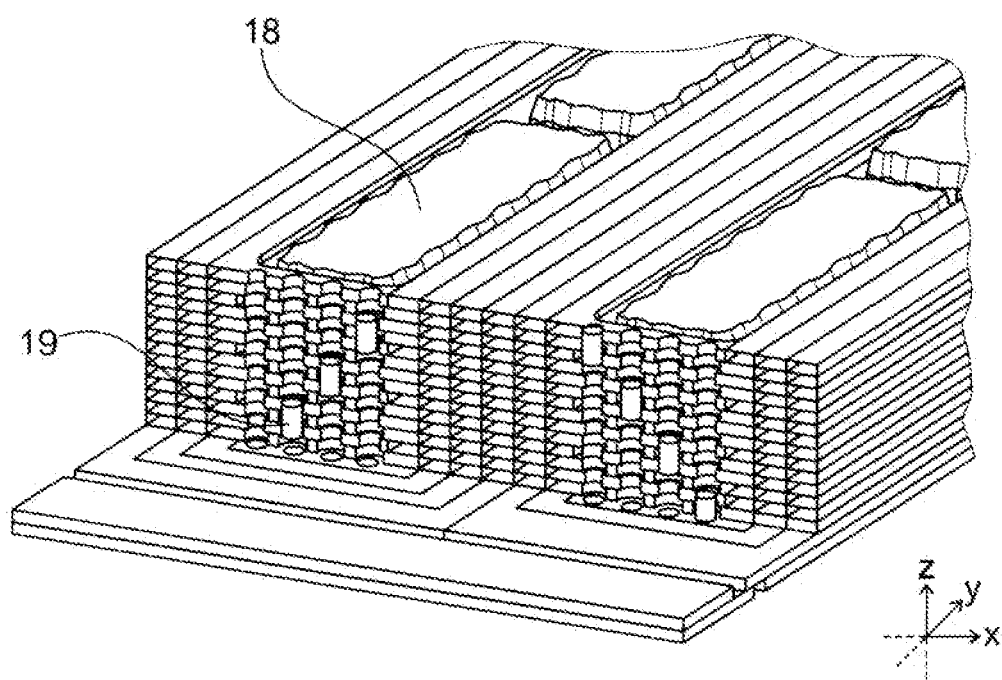
Figure 6:
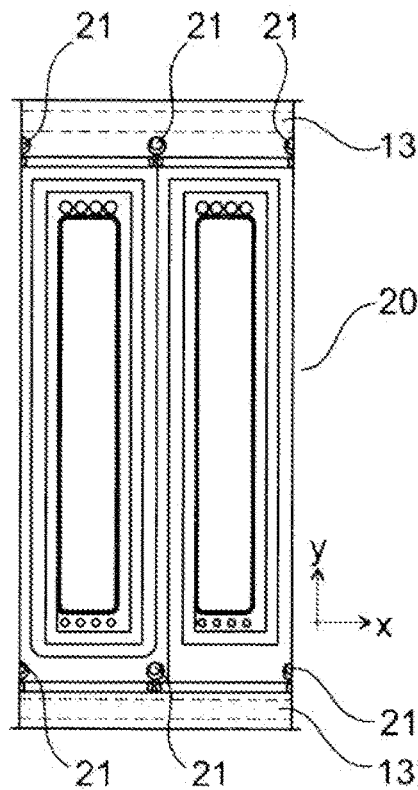
Figure 7:
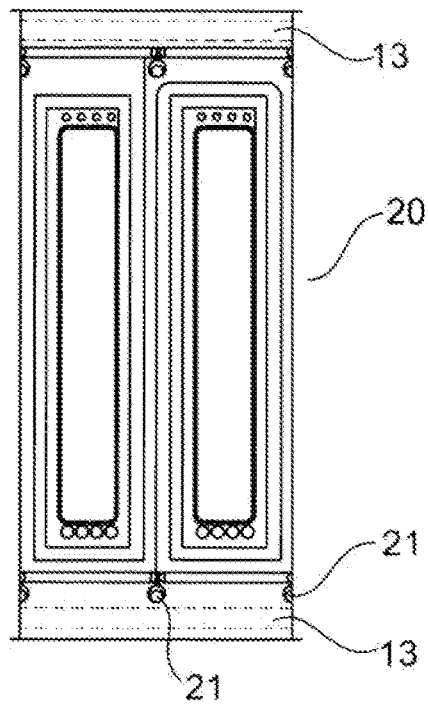
Figure 8:
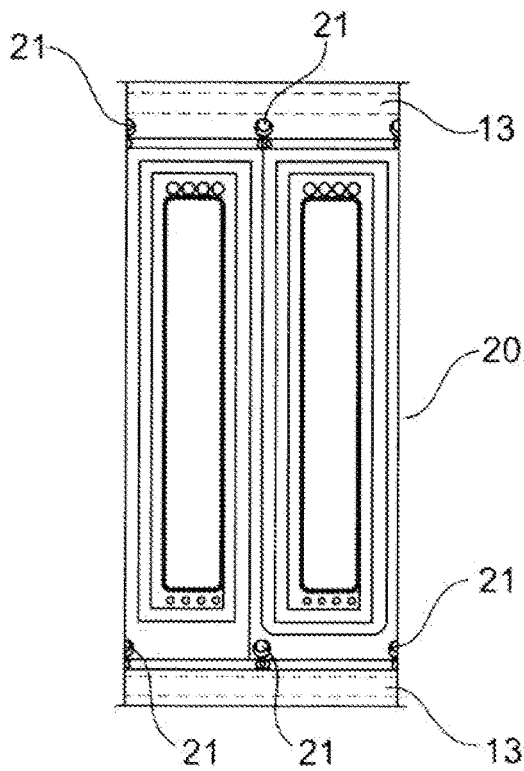
Figure 9:
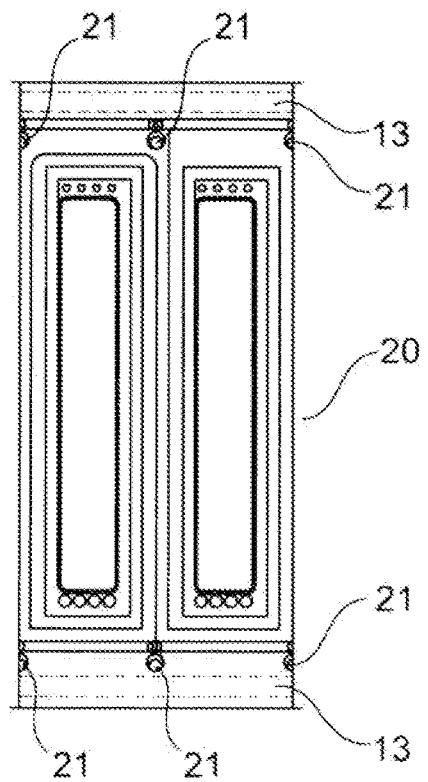
Figure 10:
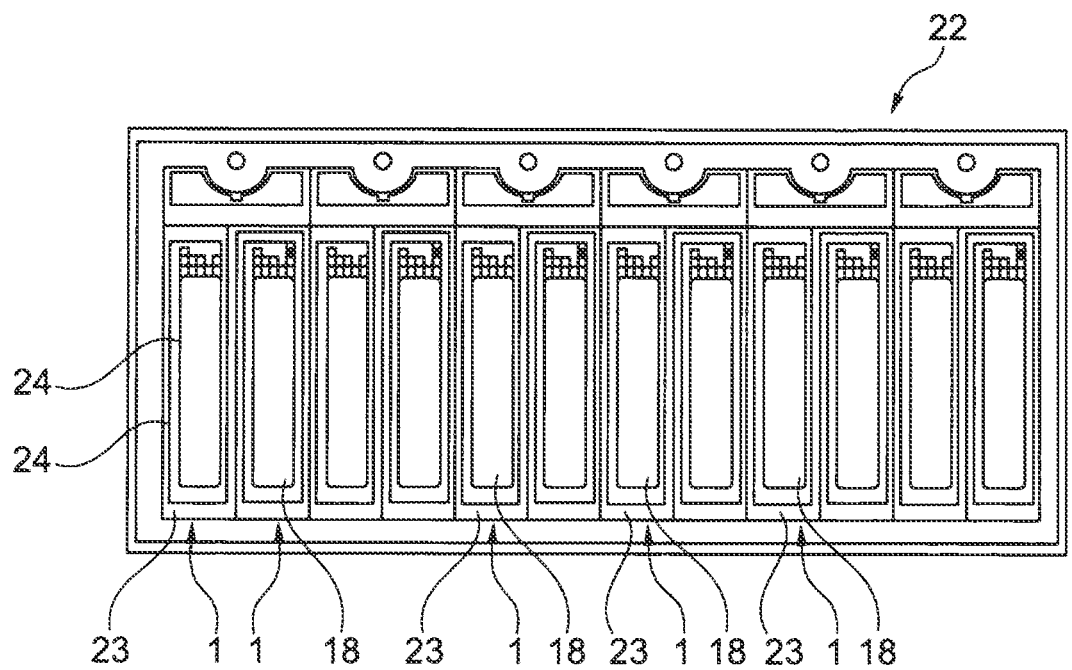
Figure 11:
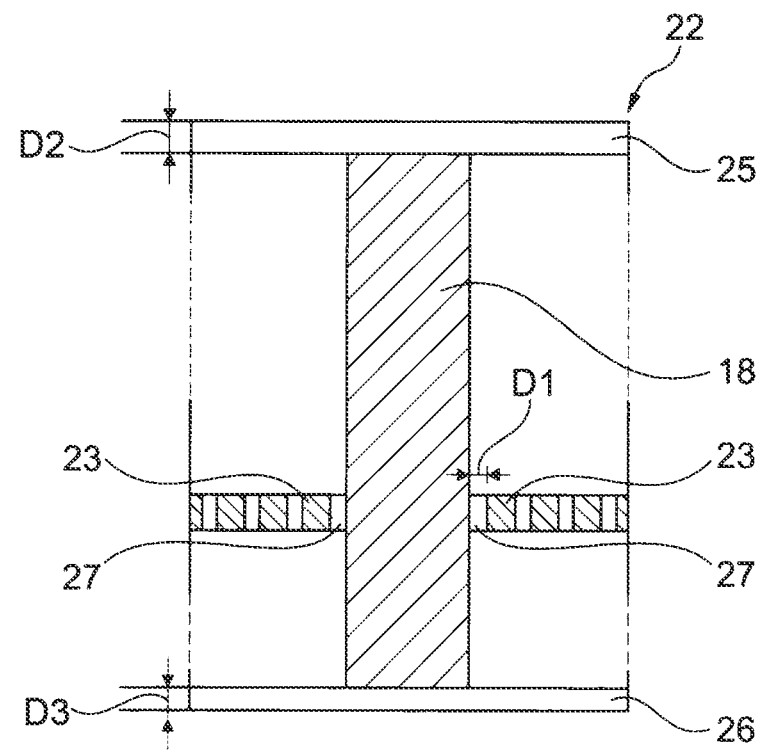
Figure 12:
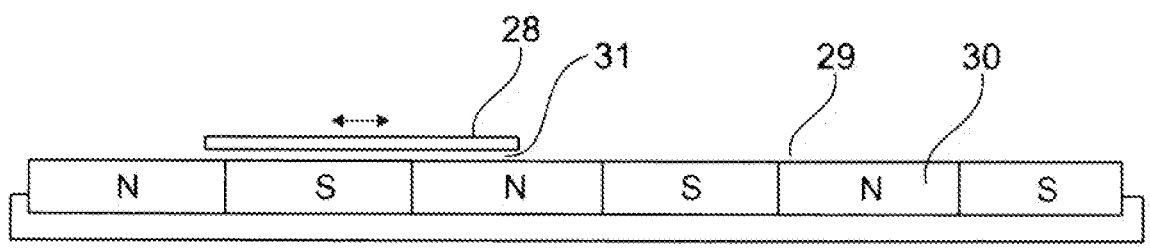

FIG. 1: shows a coil known from the prior art with planar coils which are vertically situated one above the other, FIG. 2: shows a coil known from the prior art with planar coils which are vertically situated one above the other, in which a lateral offset of vertically adjacent conductor track sections is provided, FIG. 3: shows an embodiment of a coil system in the form of two multilayer boards which are stacked one above the other with a base-insulated cooling channel, FIG. 3A: is a detail of area 3A in FIG. 3, FIG. 4: shows a coil system with punched planar coils which are vertically layered one above the other, FIG. 5: shows a sectional view of the coil system from FIG. 4 with a punched planar coils which are vertically layered one above the other, FIG. 6: shows a metal sheet cut of a coil system according to FIGS. 4 and 5, FIG. 7: shows the metal sheet cut according to FIG. 6 after rotation by 180° about an axis perpendicular to the plane of the drawing, FIG. 8: shows the metal sheet cut according to FIG. 6 after mirroring about the vertical central axis, FIG. 9: shows the metal sheet cut according to FIG. 7 after mirroring about the vertical central axis, FIG. 10: shows a section through a coil system designed as a printed circuit board with an iron core and prepreg layers on the top and bottom, FIG. 11: shows a cross-section of a further coil system designed as a printed circuit board with a large number of laterally adjacent coils with planar coils which are vertically layered one above the other, and FIG. 12: shows a linear motor with a primary part designed as a multilayer board according to an embodiment of the invention.

WRITTEN DESCRIPTION

FIG. 3 shows an embodiment coil system CS in the form of two multilayer boards 11, 12 which are stacked one above the other each with a base-insulated cooling channel 13. FIG. 3A is a detail of area 3A in FIG. 3. Multilayer boards 11 and 12 are constructed identically. Upper multilayer board 12 of the same design has been placed on lower multilayer board 11 rotated by 180°. An insulation layer made of prepreg layer 9 is located between multilayer boards 11 and 12.

In the discussion that follows, the terms "winding" and "planar coil" are used interchangeably. In the example of FIG. 3, boards 11 and 12 each include planar coils 1-6 having the same shingled arrangement as has already been explained in connection with FIG. 2. The outer windings of spiral-shaped windings 1-6, which are stacked one above the other in vertical direction VD, also engage in passive conductor track structure 7 in a comb-like manner. Cooling channel 13 is located laterally adjacent to passive conductor track structure 7, which was milled into multilayer boards 11 and 12 and was metallized on its inside before multilayer boards 11 and 12 were layered one above the other. Metallization 14, applied to the inside of each respective cooling channel 13, is galvanically connected to passive conductor track structure 7, so that conductor track structure 7 is thermally excellently connected to the inner wall of each cooling channel 13. A liquid coolant (not shown) flows through cooling channel 13, so that the heat introduced via passive conductor structure 7 is efficiently dissipated.

Boards 11 and 12 each include a plurality of pairs 32 of planar coils stacked in vertical direction VD, for example pairs 1 and 2, 3 and 4, and 5 and 6. Each of planar coils 1 through 6 includes outer turn 33. The following is directed to planar coils 1 and 2, and 3 and 4 of board 12; however, it is understood that the discussion is applicable to pairs 1 and 2, and 3 and 4 of board 11. Planar coils 1 and 3 include outer turns 33A and planar coils 2 and 4 include outer turns 33B. Outer turns 33B are laterally offset from outer turns 33A in direction LD and laterally overlap portions of outer turns 33A.

In general, a reference character "[number][number][number][letter]" designates a specific example of an element labeled as "[number][number][number]." For example, outer turn 33A is a specific example from among outer turns 33.

Passive conductor track 7 includes pairs of thermal conductor tracks 34 and 35 stacked in vertical direction VD. Tracks 34: overlap tracks 35; are laterally offset from tracks 35; and overlap outer turns 33B. Outer turns 33A and 33B form a comb-like structure. Thermal conductor tracks 34 and 35 form a comb-like structure engaged with the comb-like structure formed by outer turns 33A and 33B.

Prepreg layer 9A is directly connected to: outer turn 33A of planar coil 3; and outer turn 33B of planar coil 2. Thus, outer turn 33A of planar coil 3 and outer turn 33B of planar coil 2 are separated, in direction VD, by distance 36, substantially equal to a thickness of prepreg layer 9A. Each outer turns 33 is aligned with one of a track 34 or a track 35 in lateral direction LD, and is separated from the one of a track 34 or a track 3 by a gap 15 at least six times greater than distance 36. For example, outer turns 33A and 33B of planar coils 1 and 2 are separated from tracks 34A and 35A by gaps 15A and 15B, respectively. For each pair 32, outer turns 33 are separated, in direction VD, by gap 37 greater than distance 36.

In the example of FIG. 3, vertically adjacent tracks 34 and 35 are directly connected to a prepreg layer 9, and distance 38 between tracks 34 and 35, connected to a same prepreg layer 9, is substantially equal to the thickness of the prepreg layer 9. For example, tracks 35A and 34B are directly connected to layer 9A.

The comb-like structure noted above for planar coils 1 through 6 is formed by outer turns 33B extending further in lateral direction LD than outer turns 33A. The comb-like structure of structure 7 is formed by the lateral offset of tracks 34 with respect to tracks 35.

The above discussion for board 12 is applicable to board 11.

The decisive factor for this very effective heat transfer is that passive conductor track structure 7 has base insulation from voltage-carrying windings 1-6 of the coil system. This enables the low-resistance connection of passive conductor track structure 7 to metallization 14 of the inner wall of cooling channel 13. In this example, the base insulation is ensured by the fact that lateral insulation gap 15 between passive conductor track structure 7 and outer turns 33 is at no point less than six times vertical gap, or distance 36, of windings 1-6 which are situated directly one above the other. In the example of FIG. 3, vertical insulation gap, or distance, 36, which is ensured by prepreg layers 9, meets the requirements for the base insulation, i.e., it is thick enough to guarantee the base insulation and the protection against accidental contact.

FIG. 4 shows coil system CS with punched planar coils 17 which are vertically layered one above the other. Each planar coil 17 has been stamped out of a metal sheet, in particular a copper sheet, together with a passive conductor track 16. Passive, stamped conductor tracks 16, which are situated one above the other, engage in the outer turns of stamped coils 17 in a comb-like manner. The metal sheet cuts which are stacked one above the other with the resulting punched windings 17 and punched passive conductor tracks 16 are designed in such a way that a cooling channel 13 can in turn be formed at one end face. The arrangement shown, which forms cooling channel 13, is also located on the opposite, end-face end of the coil system (not shown here).

Wall 38 bounds a portion of channel 14. Wall 38 is electrically isolated from planar coils 1 through 6 by lateral insulation gaps 15. In the example of FIG. 3, thermal conductor tracks 34 and 35 contact wall 38.

Here, too, there is a prepreg layer 9 between individual punched windings 17. Prepreg layers 9 are placed between punched windings 17 before windings 17 are stacked one above the other. The entire stack is then baked in the oven so that a mechanical composite of punched windings 17 that are electrically insulated from one another is created.

An important criterion when dimensioning gaps 15 between the turns of the stamped winding and between stamped windings 17 and stamped passive conductor tracks 16 is again the guarantee of base insulation from cooling channel 13.

To increase the magnetic flux density that can be generated with coil system CS, spiral-shaped, stamped windings 17 are axially penetrated by iron cores 18 made of SMC material.

In order to realize a coil system in the manner of a solenoid coil from individual, stacked, stamped windings 17, stamped windings 17 located one above the other and are electrically connected to each other. This is achieved by the targeted introduction of electrical vias 19 between vertically adjacent, punched windings 17. Electrical vias 19 can be seen more clearly in FIG. 5, which is a sectional view of the coil system from FIG. 4. Electrical vias 19 are metal pins, in particular copper pins, which are introduced into corresponding bores. After the winding stack has been drilled through at the appropriate points, electrically conductive pins are first driven into the drill holes, which penetrate the entire winding stack. In order to realize the illustrated, specific electrical connections between two vertically adjacent, punched windings 17, the undesired part of each electrically conductive pin is then drilled out so that electrical via 19 only remains at the desired location.

FIGS. 6-9 show metal sheet cut 20 on the basis of which coil system CS shown in FIGS. 4 and 5 is constructed. The same metal sheet cut 20 is shown in all figures. FIG. 7 shows the metal sheet cut according to FIG. 6 after rotation by 180° about an axis of rotation perpendicular to the plane of the drawing. FIG. 8 shows the metal sheet cut according to FIG. 6 after it has been mirrored on the vertical central axis, the y-axis. The metal sheet cut in FIG. 9 corresponds to the metal sheet cut from FIG. 7, but also mirrored on the vertical central axis. Referring to the illustration in FIG. 6, the metal sheet cut shown in FIG. 9 corresponds to a rotation of the metal sheet cut according to FIG. 6 by 180° about the axis of rotation running orthogonally to the x- and y-planes and subsequent mirroring on the vertically running central axis, the y-axis.

Coil system CS shown in FIGS. 4 and 5 can now be constructed very easily by successively stacking metal sheet cuts 20 in the layers shown in FIGS. 6-9. This means that a metal sheet cut according to FIG. 6 is followed by a metal sheet cut according to FIG. 7, on which in turn a metal sheet cut according to FIG. 8 is placed and finally a metal sheet cut according to FIG. 9 closes the resulting stack towards the top. A prepreg layer is placed between the metal sheet cuts 20 for insulation.

Since metal sheet cuts 20 have no axial symmetry either with respect to their longitudinal axis Y or with respect to their transverse axis X, the desired shingling occurs when metal sheet cuts 20 are layered one above the other, which is responsible for the advantageous lateral heat transport within coil system CS.

At the front ends of metal sheet cut 20, the position of the cooling channel is marked by a dashed line. This is only milled into the resulting stack after individual metal sheet cuts 20 have been layered one above the other and then metallized.

The coil system can consist of more than four punched planar coils. The sequence of the arrangement of metal sheet cuts 20 then continues successively as described in connection with FIGS. 6-9. This means that a metal sheet 20 cut according to FIG. 9 is followed by another metal sheet 20 cut according to FIG. 6, which in turn is covered by a metal sheet cut 20 according to FIG. 7, and so on. The order of the layering can also be changed as long as the desired shingling is maintained.

The positions of metal sheet cuts 20 are indicated with the reference symbol 21 in FIGS. 6-9, in which bores 21 are made after metal sheet cuts 20 have been layered one above the other. Bores 21 separate the electrical contact from the cooling channel after the layers have been glued.

FIG. 10 shows a sectional illustration through printed circuit board 22 according to an example embodiment. The sectional plane runs parallel to the plane of printed circuit board 22 through an inner layer of printed circuit board 22. The inner layer of printed circuit board 22 has a plurality of conductor tracks 23 which are designed to run in a spiral, so that a plurality of windings 1 are formed within this layer. By means of each winding 1, a magnetic field can be generated which is oriented perpendicular to the plane of the printed circuit board 22—here the cutting plane. The magnetic field has its maximum in the center of each respective spiral formed by conductor track 23.

Conductor track 23 is formed from a metallic material, for example from a copper-containing material, for example from copper. Conductor track 23 is surrounded by dielectric material 24, which electrically insulates the individual sections of spiral-shaped conductor track 23 from one another. In an example embodiment, dielectric material 24 is an FR4 material.

In addition to the position of printed circuit board 22 shown in FIG. 10, printed circuit board 22 has further layers. In this respect, printed circuit board 22 is a multilayer printed circuit board, which is also referred to as a multilayer board. Printed circuit board 22 can have four, eight, ten, twelve, fourteen or more layers, wherein conductor tracks are arranged in each layer. The conductor tracks of the other layers also have a spiral structure, so that planar coils are also formed in these layers. The conductor tracks 23 of respectively adjacent layers are connected to one another via what are termed vias 19, electrically conductive connections perpendicular to the plane of the board. In the layer shown in FIG. 10, for example, vias 19 are provided which connect conductor tracks 23 to the conductor tracks of the adjacent layers, so that windings 1 are formed which extend in a direction perpendicular to the plane of the plate.

A plurality of separate iron cores 18 made of a ferromagnetic or ferrimagnetic material are also arranged within printed circuit board 22. Each iron core 18 extends in a direction that is perpendicular to the layers of printed circuit board 22. Iron core 18 is formed from metal sheets and/or layers of pressed powder material. The material of iron core 18 is iron, a ferromagnetic alloy or a ferrite. Iron core 18 is provided within spiral-shaped conductor track 23, which forms winding 1. The magnetic flux generated by winding 1 is bundled by iron core 18 and the magnetic flux density is increased.

Iron cores 18 are provided completely within printed circuit board 22 and are electrically insulated from the surroundings of printed circuit board 22. Iron cores 18 are insulated via a first dielectric layer which is arranged parallel to the layers of printed circuit board 22, for example a dielectric cover layer of printed circuit board 22. The respective iron core 18 on a first surface of printed circuit board 22 can be insulated from the environment via the first dielectric layer. Furthermore, printed circuit board 22 has a second dielectric layer, which is also arranged parallel to the layers of printed circuit board 22. Iron cores 18 are arranged within printed circuit board 22 between the first and the second dielectric layer. In this respect, each iron core 18 is insulated from the environment by the first dielectric layer on a first surface of printed circuit board 22 and by the second dielectric layer on a second surface which is opposite the first surface.

In an example embodiment, the first and second dielectric layers are formed from an FR4 material. In an example embodiment, the thermal conductivity of the FR4 material is at least 0.5 W/(mK), for example, at least 1 W/(mK), so that the ohmic heat loss that occurs during operation of the coil can be better dissipated through the first and second dielectric layer to the outside.

The first and the second dielectric layer provide base insulation of the iron core 18 from the surroundings of printed circuit board 22. The arrangement of iron cores 18 completely within printed circuit board 22 enables, for example, a compact design of an electric motor; in addition, it also allows the insulation provided inside printed circuit board 22 between respective iron core 18 and associated winding 1 to be designed to be weaker and thus to boost the performance of winding 1 and the resulting coil from the stacked windings or the electric motor in which printed circuit board 22 is used. These advantages are to be explained in more detail below with reference to the illustration in FIG. 11.

FIG. 11 shows a an example embodiment of printed circuit board 22 for an electric motor. In contrast to the example embodiment shown in FIG. 10, only one iron core 18 is shown in FIG. 11. Printed circuit board 22 of this further example embodiment, like the printed circuit board according to FIG. 10, can have several separate iron cores 18 made of a ferromagnetic or ferrimagnetic material. Dielectric layer 25 is provided on a first surface of printed circuit board 22, which is referred to below as the upper side. Dielectric layer 26 is arranged on a second surface of printed circuit board 1 opposite the first surface, referred to below as the lower side. Iron core 18 is thus arranged within printed circuit board 22 between dielectric layer 25 and dielectric layer 26. Dielectric layer 25 forms a cover layer on the upper side of printed circuit board 22 and Dielectric layer 26 forms a cover layer on the lower side of printed circuit board 22.

The illustration in FIG. 11 also shows a layer of the printed circuit board 22 which has spiral-shaped conductor track 23. In addition to the layer shown, there can be further layers with, in particular, spiral-shaped conductor tracks 23 which are electrically connected to conductor track 23 of the layer shown. For the electrical insulation of conductor track 23 from iron core 18, insulating region 27 of the layer is provided. Insulating region 27 is formed from a dielectric material, for example from an FR4 material. The material of insulating region 27 and/or the dimensioning of insulating region 27 are selected such that dielectric layer 25 and dielectric layer 26 have a greater breakdown voltage and/or a greater insulation resistance compared to the insulating region. Dielectric layer 25 and dielectric layer 26 can thus enable the base insulation of the coil and iron core from the surroundings. The insulation between conductor track 23 of the winding and iron core 18 must only meet the lower requirements of functional insulation. In an example embodiment, insulating region 27 and dielectric layer 25 and dielectric layer 26 are formed from the same dielectric material and thickness D1 of insulating region 27 is less than thickness D2 of dielectric layer 25 and is less than thickness D3 of dielectric layer 26. Alternatively, it is possible for insulating region 27 to be formed from a different dielectric material than dielectric layer 25 and dielectric layer 26, such that D1 of insulating region 27 is greater than thickness D2 of dielectric layer 25 and greater than thickness D3 of dielectric layer 26. For example, thickness D1 of insulating region 27 is in the range from 200 µm to 300 µm, and thickness D2 of dielectric layer 25 and thickness D3 of dielectric layer 26 are in the range from 110 µm to 190 µm, for example, in the range from 140 µm to 160 µm, or 150 µm.

FIG. 12 schematically shows a linear motor with primary part 28, which can be constructed as a multilayer board. Such a primary part 28 is very compact and light, so that it is particularly suitable for highly dynamic applications. Primary part 28 is in electromagnetic interaction with secondary part 29. Secondary part 29 includes permanent magnets 30 which are embedded in a soft iron bed. Primary part 28 and secondary part 29 are spaced apart from one another by air gap 31. By suitably energizing the solenoid coils present in primary part 28, a translational, highly dynamic movement of primary part 28 can be realized.

LIST OF REFERENCE SYMBOLS

CS coil system
LD lateral direction
VD vertical direction
1-6 Planar coils

7 Passive conductor track structure
8 Thermal via
9 Prepreg layer
9A Prepreg layer
10 Cooling element
11 Lower multilayer board
12 Upper multilayer board
13 Cooling channel
14 Metallization
15 Lateral insulation gap
15A Lateral insulation gap
15B Lateral insulation gap
16 Punched passive conductor track
17 Punched winding
18 Iron core
19 Electrical via
20 Metal sheet cut
21 Bores
22 Printed circuit board
23 Conductor track
24 Dielectric material
25 First dielectric layer
26 Second dielectric layer
27 Insulating region
28 Primary part
29 Secondary part
30 Permanent magnets
31 Air gap
32 pair, planar coils
33 outer turn
33A outer turn
33B outer turn
34 thermal conductor track
34A thermal conductor track
34B thermal conductor track
35 thermal conductor track
35A thermal conductor track
36 vertical gap or distance
37 vertical gap or distance
38 wall

The invention claimed is:

1. A coil system, comprising:
a plurality of pairs of planar coils stacked in a vertical direction, each pair of planar coils including:
   a first planar coil including a first outer turn; and
   a second planar coil including a second outer turn, the second outer turn overlapping the first outer turn and laterally offset from the first outer turn;
a plurality of pairs of thermal conductor tracks stacked in the vertical direction, each pair of thermal conductor tracks including:
   a first thermal conductor track; and
   a second thermal conductor track overlapping a portion of the first thermal conductor track, laterally offset from the first thermal conductor track, and overlapping the first outer turns of the plurality of pairs of planar coils, wherein:
      the plurality of pairs of thermal conductor tracks are DC isolated from the plurality of pairs of planar coils;
      the first outer turns and the second outer turns of the plurality of pairs of planar coils form a first comb-like structure; and,
      the plurality of pairs of thermal conductor tracks form a second comb-like structure engaged with the first comb-like structure; and,
      a wall bounding a portion of a cooling channel, wherein the cooling channel is arranged to receive a cooling fluid and the wall is electrically isolated from the plurality of pairs of planar coils.

2. The coil system of claim 1, further comprising:
a prepreg layer directly connected to:
the first outer turn of a first pair of planar coils of the plurality of pairs of planar coils;
and the second outer turn of a second pair of planar coils of the plurality of pairs of planar coils, wherein:
the first outer turn of the first pair of planar coils is separated, in the vertical direction, from the second outer turn of the second pair of planar coils by a first distance;
each first thermal conductor track is separated, in a lateral direction orthogonal to the vertical direction, from a respective first outer turn by a first gap at least six times greater than the first distance; and
each second thermal conductor track is separated, in the lateral direction, from a respective second outer turn by a second gap at least six times greater than the first distance.

3. The coil system of claim 1, wherein: the second thermal conductor tracks extend past the first thermal conductor tracks in a lateral direction orthogonal to the vertical direction; and
the second outer turns extend past the first outer turns in the lateral direction.

4. The coil system of claim 1, further comprising:
a prepreg layer directly connected to:
the first thermal conductor track of a first pair of thermal conductor tracks of the plurality of pairs of thermal conductor tracks; and
the second thermal conductor track of a second pair of thermal conductor tracks of the plurality of pairs of thermal conductor tracks;
wherein:
the first thermal conductor track of the first pair of thermal conductor tracks is separated, in the vertical direction, from the second thermal conductor track of the second pair of thermal conductor tracks by a first distance;
each first thermal conductor track is separated, in a lateral direction orthogonal to the vertical direction, from a respective first outer turn by a first gap at least six times greater than the first distance; and
each second thermal conductor track is separated, in the lateral direction, from a respective second outer turn by a second gap at least six times greater than the first distance.

5. The coil system of claim 1, wherein the plurality of pairs of thermal conductor tracks is in contact with the wall of the cooling channel.

6. The coil system of claim 1, wherein the wall:
is metalized; and is galvanically connected to the plurality of pairs of thermal conductor tracks.

7. The coil system of claim 1, further comprising:
an iron core penetrating the plurality of pairs of planar coils.

8. The coil system of claim 1, further comprising:
a plurality of prepreg layers disposed between the plurality of pairs of planar coils and the plurality of pairs of thermal conductor tracks.

9. The coil system of claim 1, further comprising:
a pin electrically connecting the plurality of pairs of planar coils.

10. The coil system of claim 1, wherein: for a first pair of planar coils of the plurality of pairs of planar coils:
the first planar coil is arranged in a first configuration; and
the second planar coil is arranged in a second configuration, the second configuration created by rotating the first configuration 180 degrees around a vertical central axis; and
for a second pair of planar coils of the plurality of pairs of planar coils, stacked on the first pair of planar coils:
the first planar coil is arranged in a third configuration, the third configuration created by mirroring the first configuration on the vertical central axis; and
the second planar coil is arranged in a fourth configuration, the fourth configuration created by mirroring the second configuration on the vertical central axis.

11. A coil system, comprising:
a plurality of pairs of planar coils stacked in a vertical direction, each pair of planar coils including:
a first planar coil including a first outer turn; and
a second planar coil including a second outer turn, the second outer turn overlapping the first outer turn and laterally offset from the first outer turn; and
a plurality of pairs of thermal conductor tracks stacked in the vertical direction, each pair of thermal conductor tracks including: a first thermal conductor track; and
a second thermal conductor track overlapping a portion of the first thermal conductor track, laterally offset from the first thermal conductor track, and overlapping the first outer turns of the plurality of pairs of planar coils, wherein:
for each pair of planar coils, the first outer turn is separated, in the vertical direction, from the second outer turn by a first gap;
a first pair of planar coils of the plurality of pairs of planar coils is vertically adjacent to a second pair of planar coils of the plurality of pairs of planar coils;
the first outer turn of the first pair of planar coils is separated, in the vertical direction, from the second outer turn of the second pair of planar coils by a distance less than the first gap;
each first thermal conductor track is separated, in a lateral direction orthogonal to the vertical direction, from a respective first outer turn by a second gap at least six times greater than the distance, the second gap being configured to increase a rate of heat transfer; and
each second thermal conductor track is separated, in the lateral direction, from a respective second outer turn by a third gap at least six times greater than the distance, the third gap being configured to increase a rate of heat transfer.

12. The coil system of claim 11, wherein: the second thermal conductor tracks extend past the first thermal conductor tracks in the lateral direction; and the second outer turns extend past the first outer turns in the lateral direction.

13. The coil system of claim 11, further comprising:
a wall bounding a portion of a cooling channel, wherein:
the cooling channel is arranged to receive a cooling fluid; and the wall is electrically isolated from the plurality of pairs of planar coils.

14. The coil system of claim 13, wherein the plurality of pairs of thermal conductor tracks is in contact with the wall of the cooling channel.

15. The coil system of claim 14, wherein the wall: is metalized; and
is galvanically connected to the plurality of pairs of thermal conductor tracks.

16. The coil system of claim 11, further comprising: an iron core penetrating the plurality of pairs of planar coils.

17. A method of producing a coil system, comprising:
producing a plurality of pairs of planar coils, each pair of planar coils including:
a first planar coil including a first outer turn; and
a second planar coil including a second outer turn overlapping the first outer turn and laterally offset from the first outer turn;
stacking the plurality of pairs of planar coils in a vertical direction;
forming a first comb-like structure with the first outer turns and the second outer turns of the plurality of pairs of planar coils;
producing a plurality of pairs of thermal conductor tracks, each pair of thermal conductor tracks including:
a first thermal conductor track; and
a second thermal conductor track overlapping a portion of the first thermal conductor track, laterally offset from the first thermal conductor track, and overlapping the first outer turns of the plurality of pairs of planar coils;
stacking the plurality of pairs of thermal conductor tracks in the vertical direction;
forming a second comb-like structure with the plurality of pairs of thermal conductor tracks; and,
engaging the first comb-like structure with the second comb-like structure;
wherein:
for a first pair of planar coils of the plurality of pairs of planar coils:
the first planar coil is arranged in a first configuration; and
the second planar coil is arranged in a second configuration, the second configuration created by rotating the first configuration 180 degrees around a vertical central axis; and
for a second pair of planar coils of the plurality of pairs of planar coils, stacked on the first pair of planar coils:
the first planar coil is arranged in a third configuration, the third configuration created by mirroring the first configuration on the vertical central axis; and
the second planar coil is arranged in a fourth configuration, the fourth configuration created by mirroring the second configuration on the vertical central axis.

18. The method of claim 17 further comprising:
directly connecting a prepreg layer to:
a first outer turn of a first pair of planar coils of the plurality of pairs of planar coils;
and a second outer turn of a second pair of planar coils of the plurality of pairs of planar coils;
separating, in the vertical direction, the first outer turn of the first pair of planar coils from the second outer turn of the second pair of planar coils by a distance;
separating, in a lateral direction orthogonal to the vertical direction, each first thermal conductor track from a respective first outer turn by a first gap at least six times greater than the distance; and
separating, in the lateral direction, each second thermal conductor track from a respective second outer turn by a second gap at least six times greater than the distance.

19. The method of claim 17, further comprising: metalizing a wall bounding a portion of a cooling channel, the cooling channel arranged to receive cooling fluid, and galvanically connecting the plurality of pairs of thermal conductor tracks to the wall;
  or penetrating the plurality of pairs of planar coils with an iron core.

* * * * *